May 26, 1970 R. J. SCHMIDLIN ET AL Re. 26,896

SHEET FEEDING MECHANISM

Original Filed July 29, 1966

INVENTORS.
RAYMOND J. SCHMIDLIN
PHILIP O. SHEMKUNAS

BY Nilmer H. Hall
AGENT.

United States Patent Office

Re. 26,896
Reissued May 26, 1970

26,896
SHEET FEEDING MECHANISM

Raymond J. Schmidlin, Lyndhurst, and Philip O. Shemkunas, Mentor, Ohio, by Addressograph-Multigraph Corporation, Cleveland, Ohio, a corporation of Delaware, assignee Original No. 3,391,924, dated July 9, 1968, Ser. No. 568,839, July 29, 1966. Application for reissue Apr. 14, 1969, Ser. No. 830,164
Int. Cl. B65h *3/44, 5/26, 7/00*
U.S. Cl. 271—9 4 Claims

Matter enclosed in heavy brackets [ ] appears in the original patent but forms no part of this reissue specification; matter printed in italics indicates the additions made by reissue.

ABSTRACT OF THE DISCLOSURE

A vacuum foot feed device for feeding two side-by-side stacks of paper, wherein the vacuum line contains a vacuum chamber with a flexible diaphragm for sensing the increase of pressure due to failure of a vacuum foot to properly seal against a paper, and a sheet diverting means operative in response to diaphragm detection for preventing paper entering a printing press in the absence of a full quota of such paper.

This invention relates to sheet feeding mechanisms, and is especially concerned with sheet feeding mechanisms which are adapted to feed sheets to another mechanism, such as a printing or duplicating machine.

The general object of the present invention is to provide a sheet feeding mechanism which will remove sheets one at a time from each of two, side-by-side stacks or piles of sheets simultaneously and deliver them to and in timed relationship with another mechanism, such as a duplicating machine.

In many instances there are distinct advantages in feeding two separate sheets from two side-by-side stacks of sheets, as compared to feeding larger sheets from a single stack of sheets and then cutting the larger sheets into two separate sheets either before or after a printing or duplicating operation. Among such advantages are:

The ability to feed different length sheets at the same time.
The ability to use different color sheets at the same time.
Positive control of terminal sheet size, i.e. avoidance of size variations due to slitting on the machine.
The need to inventory only the end use sheet size.
The capability of printing from two differently imaged short run duplicating machine masters at the same time to save operating time.

Accordingly, it is also an object of the invention to provide a sheet feeding mechanism which will satisfactorily afford the aforementioned advantages.

Another object of the invention is to provide an improved sheet detecting and diverting mechanism for a sheet feeder which will detect failure of a sheet to be fed from either of two stacks of sheets and will divert the fed sheet from the other stack away from the normal path of sheet delivery.

Other and further objects, features and advantages of the present invention will be apparent as the description proceeds.

In the drawings:

FIG. 1 is a perspective of the sheet feeder of the present invention, with certain portions broken away, showing the mechanism for feeding the sheets in side-by-side relation and for controlling the diverting of sheets upon failure of a sheet to be fed from either stack. For purposes of clarity of description, the sheet diverting mechanism is shown removed from the feeding mechanism a distance somewhat greater than normal.

Figures 1, 2, 3:
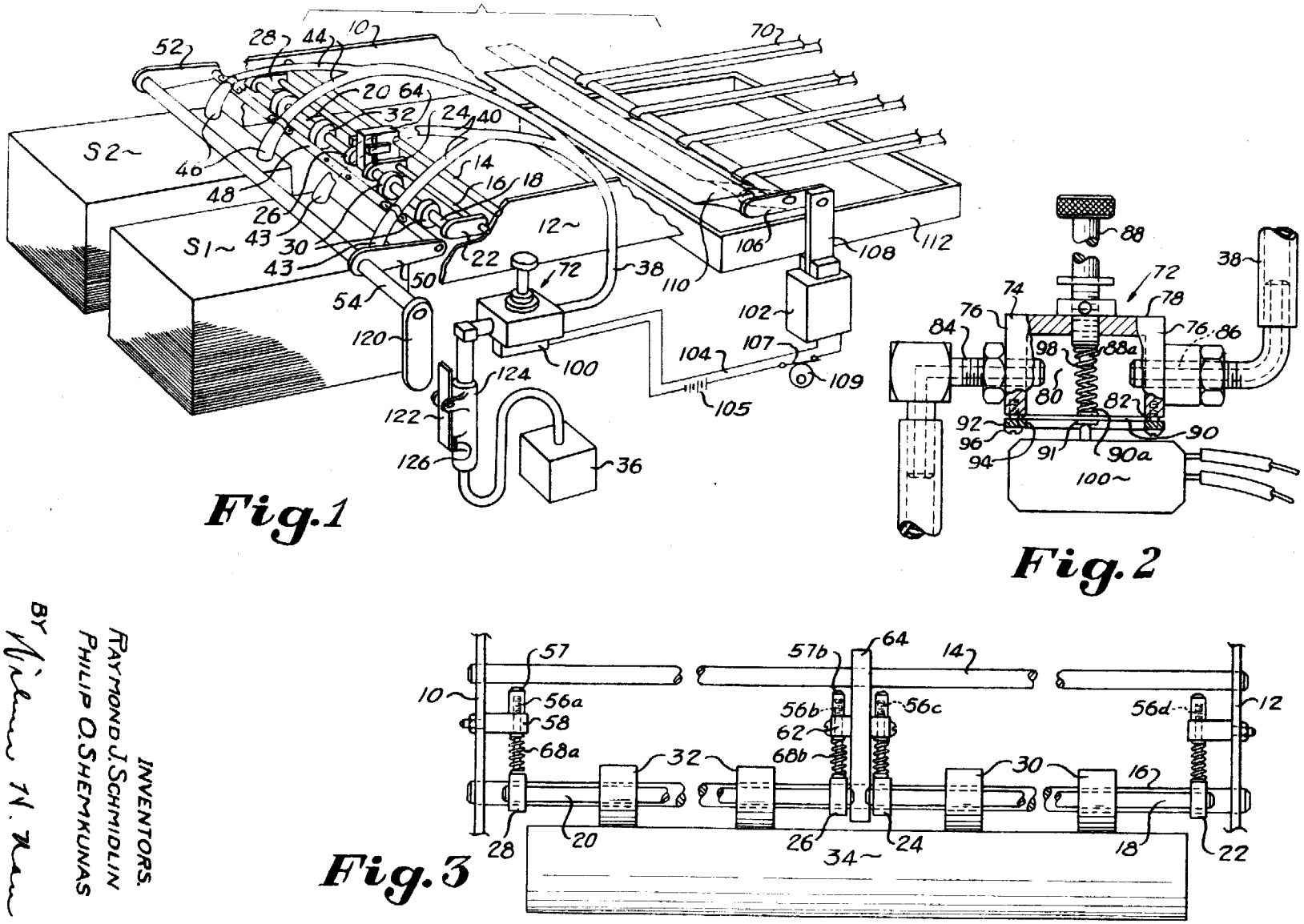
FIG. 2 is an enlarged detail section, with certain portions broken away, showing the controlling mechanism of FIG. 1 for diverting the sheets.
FIG. 3 is an enlarged detail view showing the mechanism for separately adjusting the feed rollers for each of the two stacks of sheets.

The sheet feeding device of the present invention is an improvement in the sheet feeding device disclosed in U.S. Patent No. 2,293,046 in that it is capable of feeding two sheets simultaneously from two stacks of sheets arranged side-by-side rather than feeding single sheets from a single stack. However, the basic principles of separating the top sheet and advancing it toward feed rollers for further advancement to a duplicating machine is substantially like the arrangement shown in the aforesaid patent, and reference thereto will provide a clear understanding of this aspect of the invention.

Bearing in mind that the present invention is concerned primarily with the simultaneous feeding of two sheets from two stacks of sheets, it is deemed sufficient to describe only the novel features of the invention as they relate to improvements, over the disclosure of the aforesaid patent.

The sheet feeding device includes side frames 10 and 12, spaced apart by tie-rods 14, 16. Positioned between the side plates are a pair of shafts 18 and 20. One end of shaft 18 is held by arm 22, and the other end by arm 24. In a like manner, one end of shaft 20 is held by arm 26, and the other end by arm 28. The arms 22, 24, 26 and 28, in turn, are rockably mounted on rod 16 as shown in the drawings. Mounted on the shaft 18 are a set of upper feed rollers 30. Another set of upper feed rollers 32 are similarly mounted on shaft 20. All of the rollers 30, 32 are idler rollers and, as shown in FIG. 3, normally ride on and are driven by a constantly rotating lower feed roller 34.

Referring to FIG. 1, there are shown two stacks of sheets S1, S2 in proper position so that the top sheet of each stack may be fed to a duplicating machine, not shown. A motor driven pump 36 provides a suction means, comprising a conduit 38, branch conduits 40, 40, and a pair of suction feet 43, 43. In a like manner, conduit 38 and branch conduits 44, 44 provide suction to a set of suction feet 46, 46. The suction feet 43, 43 and 46, 46 are fixedly mounted on the foot carrying shaft 48 which, in turn, is movably mounted at each of its ends upon arms 50 and 52. The arms 50 and 52 are secured to shaft 54, which is movably mounted in side plates 10, 12.

As fully set forth in aforementioned Patent No. 2,293,-046, an up-and-down movement is imparted to the suction foot carrying shaft 48. As is well known, at its uppermost point, the shaft 48 is rocked by means not shown, in a counterclockwise direction, swinging the suction feet 43, 43 and 46, 46 in a forward direction to thereby move the top sheet in the stacks S1 and S2 into the nip of the feed rollers 30, 32 and 34.

Since different thicknesses of sheets are handled, it is desirable to provide convenient adjustment between upper feed rollers 30, 32 and lower feed roller 34 to permit accurate feeding of sheets from the stacks S1 and S2. With reference to FIG. 3, there are provided adjusting screws 56a, 56b, 56c and 56d. Adjusting screws 56a–d are mounted and perform in a like manner and a brief description of one set of adjusting screws is deemed sufficient for an understanding of this aspect of the invention. For example, adjusting screw 56a is loosely mounted in bracket 58 with an end thereof pinned to arm 28. The other end of the adjusting screw extends above the bracket and is threaded to receive the lock nut 57. Bracket 58 is fixed to side plate 10. Adjusting screw 56b is similar to screw 56a and is loosely mounted in bracket 62 which, in turn, is mounted on spacer block 64. Block 64 is secured to tie-rods 14 and 16, as shown. One end of screw 56b is pinned to arm 26 and the other end is threaded to receive lock nut 57b. Compression springs 68a and 68b, interposed between the upper surfaces of arms 28 and 26 respectively and the lower face of brackets 58 and 62 respectively, resiliently maintain the arms in their lowermost position and prevent damage to the parts. To obtain proper vertical adjustment of shaft 20 and upper feed rollers 32, 32, the adjusting screws 56a and 56b are turned to the right or to the left, as required, thus raising or lowering the shaft and upper feed rollers carried thereby.

As stated hereinbefore, the adjusting screws 56c and 56d are similar to screws 56a and 56b in design and function, and adjustment of shaft 18 and upper feed rollers 30, 30 is achieved in a manner similar to that described immediately above for shaft 20 and rollers 32, 32.

In the normal feeding of sheets from stacks S1 and S2, the top sheet in each stack is lifted by suction feet 43, 43 and 46, 46, and fed into the nip of feed rollers 30, 30, 32, 32 and 34, which then feed the sheets onto constantly running conveyor tapes 70 for delivery to a printing or duplicating mechanism, not shown.

On occasion, due to irregularities in the sheet stack or improperly cut sheets, or the like, one set of suction feet may pick up a sheet from the stack while the other set of suction feet does not. Under such circumstances it is highly desirable that the singly fed sheet be prevented from reaching the printing mechanism so as not to interfere with other machine operations, such as the counting of sheets. In addition, it is important that a single sheet should not reach the printing position where it could trigger the usual mechanism maintaining printing contact between the cylinders and thereby cause an ink impression on the impression roller in place of the missed sheet, resulting in offset onto the backs of subsequent sheets.

To solve this problem, a simple but highly effective detecting means is provided which senses whether both sheets have been picked up by the suction feet or whether only one sheet has been picked up. If the latter condition exists, the detecting means immediately recognizes the skipping of one of the sheets and operates to divert the singly fed sheet out of the path of the conveyor tapes 70, and, of course, away from the printing mechanism. Such a skipped-sheet detection device is indicated generally by the numeral 72, FIGS. 1 and 2, and may comprise a housing 74 having walls 76 on each side thereof, and a top wall 78, forming a chamber 80. An enlarged opening 82 is provided in the bottom of the housing 74. One of the side walls 76 has an opening therein to provide a connection 84 for the communication of suction or vacuum between the chamber 80 and the pump 36. Another of the side walls 76 has an opening therein to provide a connection 86 for the communication of suction or vacuum between chamber 80 and conduits 38, 40, 40, 44, 44, to the suction feet 43, 43 and 46, 46. The top wall 78 of the housing 74 has a threaded opening therein to receive a vacuum or suction adjusting screw 88 having an end portion 88a, the function of which will be made clear as the description proceeds.

As stated hereinabove, an opening 82 is provided in the bottom of the housing 74 of the skipped-sheet detection device 72. A diaphragm 90 is provided and is of such dimension as to completely cover the opening 82. The diaphragm 90 may be of any suitable flexible material, although it has been found that steel shim stock performs entirely satisfactorily. A flat protective shield 91 may be affixed to the diaphragm, if desired. A retaining plate 92, having an opening 94 therein is provided to retain the diaphragm 90 in the position shown in FIG. 2 so as to completely seal the opening 82. Retaining plate 92 may be fastened to the housing 74 as by the screws 96. Between the end portion 88a of suction adjusting screw

88 and a spring guide 90a on diaphragm 90, there is provided a compression spring 98 which maintains the diaphragm in a predetermined position and also tends to exert a slight downward pressure on diaphragm 90, as viewed in FIG. 2. As can be readily seen, the amount of pressure exerted can be controlled by the adjusting screw 88. Thus, turning the adjusting screw in a counterclockwise direction affords lighter spring tension for feeding lightweight sheets, while clockwise turning of the adjusting screw increases spring tension for feeding heavier sheets. Accordingly, the amount of pressure exerted on the dipahragm varies according to the weight of the sheets fed.

A control switch 100 is located adjacent the housing 74 in such a position that it will be actuated by downward movement or bulging of the diaphragm 90, as will be explained more fully hereinafter. A solenoid 102, FIG. 1, is connected to control switch 100 by an electric circuit 104 including a source of power 105 and a disabling switch 107 actuated by a cam 109. A link 106 is pivotally mounted in side frame 12 and is connected at one end to plunger 108 of solenoid 102. A diverting means, comprising a gate member 110 is secured to the other end of link 106 and raises and lowers with the rocking motion of link 106 as the solenoid is energized and deenergized. A bin 112 is positioned below the gate 110 to receive any sheets diverted by the gate.

As stated hereinbefore, in normal operation the top sheet in stacks S1 and S2 will be picked up by the suction feet 43, 43 and 46, 46. As the suction feet lift the two top sheets from their respective stacks, the shaft 48 is moved to its uppermost position so that the sheets are presented between upper feed rollers 30, 30, 32, 32 and lower feed roller 34. Upward movement of the shaft 48 and arms 50 and 52 cause shaft 54 to rotate in a counterclockwise direction. The lower end of arm 120, which is secured to the shaft 54 is thus urged against lever 122. Lever 122 is pivotally mounted on valve 124 and continued movement of arm 120 will cause the lower end of lever 122 to move out of contact with an opening at 126 in valve 124, thus breaking the suction and freeing the sheets from the suction feet 43, 43 and 46, 46. Throughout such normal operation, when all the suction feet are holding the sheets, there will be a vacuum present in the chamber 80 which maintains the diaphragm 90 in its adjusted position, thus keeping the control switch 100 open to prevent the electrical pulse from raising the gate to diverting position. At the same instant as suction is broken by the separation of lever 122 from valve opening 126, the sheets enter the nip between upper feed rollers 30, 30 and 32, 32 and lower feed roller 34. The sheets then are free to travel on tapes 70 toward the printing mechanism.

However, for reasons stated earlier, there may be occasions when only one sheet is lifted from its stack. Such a single sheet must be prevented from reaching the printing mechanism and this is accomplished in the following manner, it being assumed that the switch 107 is maintained in closed position for the time being.

If either suction feet 43, 43 or 46, 46 fail to lift the top sheets in either of sheet stacks S1 or S2, suction is prematurely broken since certain of the suction feet are drawing air from the atmosphere. Such a drastic drop in suction immediately decreases the amount of vacuum in the chamber 80, whereupon the tension of spring 98 forces diaphragm 90 into contact with control switch 100, causing the switch to close. Closing of the switch 100 allows the electrical pulse to energize solenoid 102, thereby rocking link 106 and opening gate 110 to the open position shown in dotted lines in FIG. 1. In such open position, the gate diverts the singly fed sheet away from the normal path of sheet delivery and into the bin 112 prior to delivery to the printing mechanism.

It will be appreciated that the effect of the normal breaking of the suction by valve 124 could have the same effect as if one of the sets of suction feet 43, 43 or 46, 46 failed to pick up a sheet, and that if this were allowed to occur, both sheets would be diverted. To take care of this situation there is provided a cam 109 which is rotated in time with the sheet feeding cycle by conventional driving means (not shown) and which cooperates with the disabling switch 107 in the circuit 104 to maintain the switch in closed position during the portion of the cycle when sensing of the failure to feed a sheet is needed, and allows the switch to open to prevent a false diversion during the period when the vacuum is normally broken by the valve 124.

While preferred embodiments of the invention have been described and illustrated, it is to be understood that these are capable of variation and modification. Accordingly, the aim in the appended claims is to cover all such variations and modifications as may fall within the true spirit of the invention.

What is claimed is:

1. A sheet feeding mechanism for feeding sheets simultaneously from each of [at least] two stacks of sheets for delivery to a printing mechanism, comprising:

(a) suction means for separating the sheets from each of the two stacks and feeding the same into a predetermined sheet delivery path for forwardling to the printing mechanism;

said suction means comprising at least one suction foot for each stack for lifting and moving the sheets, and suction generating means for reducing the air pressure within the suction feet [, and];

[in which the sheet detection means comprises means for sensing the increased pressure resulting from failure of certain of the suction feet to make proper sealing and lifting contract with a sheet, including a vacuum chamber having a flexible diaphragm as one wall thereof;]

(b) sheet detecting means controlled by the suction means for detecting the failure of the feeding of either sheet [;] , *said sheet detecting means comprising means for sensing the increased pressure resulting from failure of certain of the suction feet to make proper sealing and lifting contact with a sheet, including a vacuum chamber having a flexible diaphragm as one wall thereof;* and (c) sheet diverting means controlled by the detecting means for diverting a singly fed sheet away from the normal path of sheet delivery so avoiding delivery to the printing mechanism.

2. A sheet feeding means according to claim 1 in which the vacuum chamber further comprises adjustable spring means acting on the diaphragm for accurately adjusting the point at which the vacuum drop will effect sensing motion of the diaphragm.

3. A sheet feeding means according to claim 1 in which the sheet diverting means embodies a rockable gate, an electrically operated means for actuating the gate, and a switch controlled by the position of the diaphragm.

4. A sheet feeding means as set forth in claim 1 in which there is also included feed rollers for taking the sheet from the suction feet; and in which there is included means timed with the machine operation for admitting air to the suction path to disable the grip of the suction feet on the sheet at the time when the sheet is engaged by said feed rolls; and means to disable the control of the sheet detecting means over the sheet diverting means during the period of action of the air admitting means.

References Cited

The following references, cited by the Examiner, are of record in the patented file of this patent or the original patent.

UNITED STATES PATENTS

| | | |
|---|---|---|
| 2,129,230 | 9/1938 | O'Neil. |
| 2,301,214 | 11/1942 | Knowlton. |
| 2,753,180 | 7/1956 | Thomas. |

EDWARD A. SROKA, Primary Examiner

U.S. Cl. X.R.

271—57, 64